United States Patent
Trahan et al.

(10) Patent No.: US 12,509,623 B2
(45) Date of Patent: Dec. 30, 2025

(54) COMPOSITION AND METHOD FOR BREAKING FRICTION REDUCING POLYMER FOR WELL FLUIDS

(71) Applicant: DOWNHOLE CHEMICAL SOLUTIONS, LLC, Frisco, TX (US)

(72) Inventors: David O. Trahan, Lafayette, LA (US); Vanessa Madrid, Youngsville, LA (US)

(73) Assignee: DOWNHOLE CHEMICAL SOLUTIONS, LLC, Frisco, TX (US)

( * ) Notice: Subject to any disclaimer, the term of this patent is extended or adjusted under 35 U.S.C. 154(b) by 0 days.

(21) Appl. No.: 17/263,346

(22) PCT Filed: Jul. 30, 2019

(86) PCT No.: PCT/US2019/044220
§ 371 (c)(1),
(2) Date: Jan. 26, 2021

(87) PCT Pub. No.: WO2020/028416
PCT Pub. Date: Feb. 6, 2020

(65) Prior Publication Data
US 2021/0284901 A1    Sep. 16, 2021

Related U.S. Application Data

(60) Provisional application No. 62/711,935, filed on Jul. 30, 2018.

(51) Int. Cl.
*C09K 8/88* (2006.01)
*C09K 8/60* (2006.01)
*C09K 8/84* (2006.01)

(52) U.S. Cl.
CPC .............. *C09K 8/885* (2013.01); *C09K 8/602* (2013.01); *C09K 8/845* (2013.01); *C09K 2208/26* (2013.01); *C09K 2208/28* (2013.01)

(58) Field of Classification Search
CPC ........ C09K 8/885; C09K 8/602; C09K 8/845; C09K 2208/26; C09K 2208/28; C09K 8/88; C09K 8/68
See application file for complete search history.

(56) References Cited

U.S. PATENT DOCUMENTS

| | | | | |
|---|---|---|---|---|
| 4,426,303 A * | 1/1984 | Nuckels | .................... | C09K 8/58 166/275 |
| 2008/0207470 A1 | 8/2008 | Welton | | |
| 2008/0234147 A1 * | 9/2008 | Li | ........................... | C09K 8/887 507/215 |
| 2009/0023613 A1 * | 1/2009 | Li | ........................... | C09K 8/94 507/211 |
| 2011/0152133 A1 * | 6/2011 | Sanders | .................... | C09K 8/68 507/239 |
| 2013/0025867 A1 * | 1/2013 | Sun | .......................... | F17D 1/17 166/308.1 |
| 2013/0153226 A1 * | 6/2013 | Weston | ................... | C09K 8/685 166/300 |
| 2013/0228334 A1 * | 9/2013 | Jiang | ..................... | C09K 8/685 166/308.2 |
| 2017/0362924 A1 * | 12/2017 | Mohs | ....................... | C09K 8/52 |

FOREIGN PATENT DOCUMENTS

| | | | | |
|---|---|---|---|---|
| CA | 1146834 A | 5/1983 | | |
| CA | 2841418 C | 2/2013 | | |
| WO | WO-2013033086 A2 * | 3/2013 | ............... | C09K 8/60 |

* cited by examiner

*Primary Examiner* — Kumar R Bhushan
(74) *Attorney, Agent, or Firm* — McCutcheon Joseph, PLLC

(57) ABSTRACT

A polymer breaking solution usable in fracking and other downhole applications comprises a solution of aqueous hydrogen peroxide, an anionic surfactant, a metal chelating agent, an acidic pH buffer, a soluble zinc compound, and in some embodiments, a viscosifying agent. In other embodiments, the solution may additionally comprise a linear hydrophobic surfactant. At treatment concentrations of between 500 ppm to 1,500 ppm, the solution is non-toxic and usable at a wide range of downhole temperatures (32° C. to 82° C.).

14 Claims, 1 Drawing Sheet

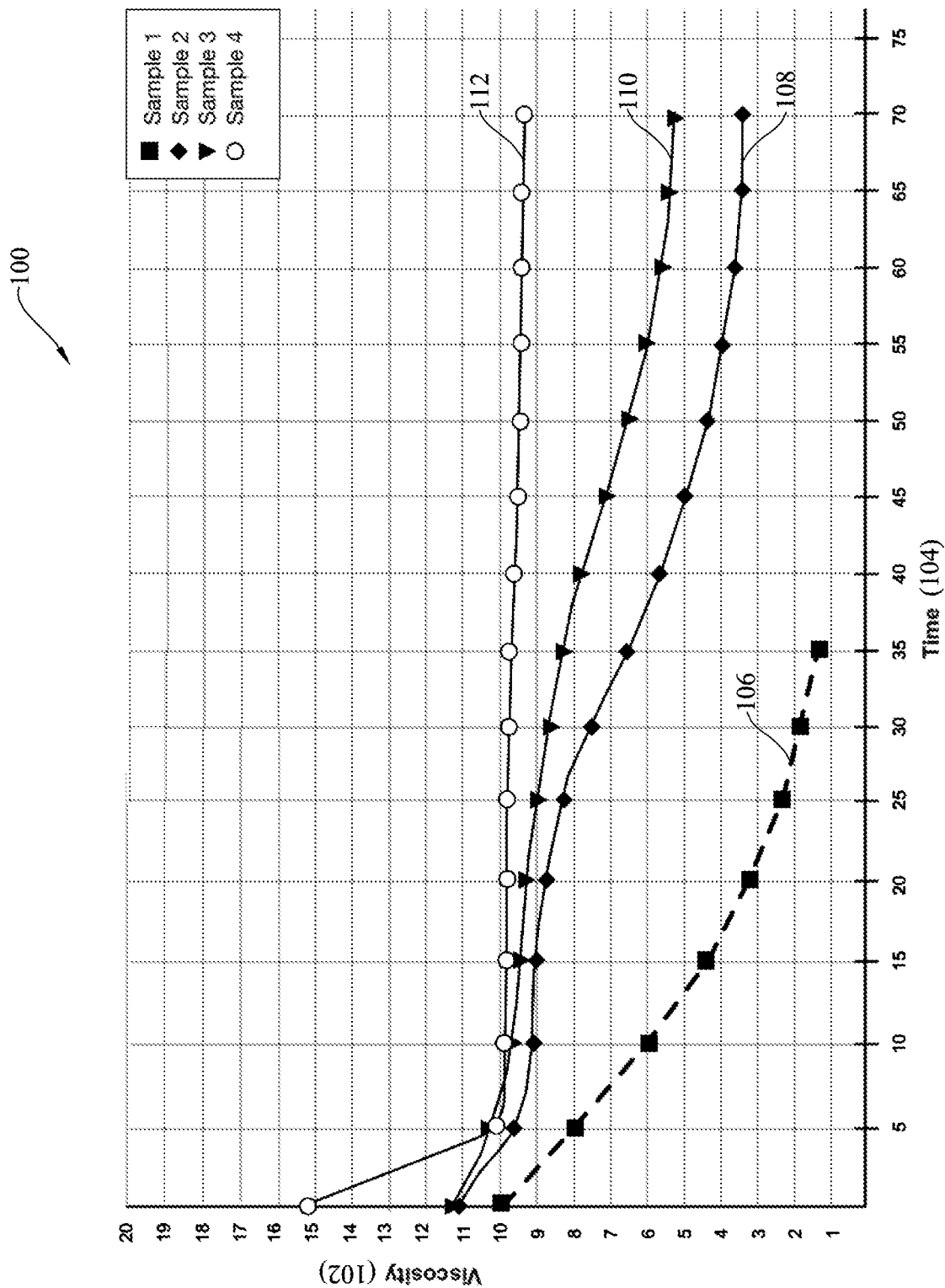

COMPOSITION AND METHOD FOR BREAKING FRICTION REDUCING POLYMER FOR WELL FLUIDS

REFERENCE TO RELATED APPLICATIONS

This is a United States utility application claiming priority to co-pending Patent Cooperation Treaty (PCT) application No. PCT/US2019/044220, also entitled "Composition and Method for Breaking Friction Reducing Polymer for Well Fluids," filed 30 Jul. 2019, which in turn claims priority to U.S. provisional application No. 62/711,935, also entitled "Composition and Method for Breaking Friction Reducing Polymer for Well Fluids," filed 30 Jul. 2018. The contents of the above-listed applications, in their entirety, are incorporated herein by reference.

FIELD

The present invention relates, generally, to an improved chemical composition and method of use for treating well fracture water.

BACKGROUND

Oil and gas production is increasingly focused on unconventional subterranean shale formations. The subterranean shale formation is penetrated by a drill bit connected to a drill pipe to create a wellbore channel down to and through the subterranean shale formation. The wellbore penetrates the oil & gas bearing shale formation vertically and horizontally, exposing a larger area of the subterranean shale formation with oil and gas. The wellbore is then used to position steel casing and production tubing to flow oil & gas from the shale formation to the surface. Before the oil & gas can flow freely from the shale formation, it is necessary to perforate and fracture the shale formation. Fracturing, or "fracking," is the process of creating a large number of micro fractures in the shale formation which provide much-improved pathways for the oil and gas to flow from the oil and gas bearing shale formation.

Well fracture operations use water-based fracturing fluid to hydraulically fracture the shale formation, often containing chemicals and proppants. Fracture treatments are performed at pressures and flow rates above the shale formation's fracture pressure, creating highly conductive fluid flow channels inside the shale formation leading to the wellbore and up to the surface. The water-based fracturing fluid is injected into the wellbore at high volumes and at high pressure to hydraulically fracture the subterranean shale formation, creating a large network of microchannels which allow oil & gas to flow back from the reservoir into the wellbore.

Friction reducers (FRs) are necessary components in today's water-based fracturing fluids. Water thus treated is commonly referred to as "slickwater". Friction reducers are typically low to high molecular weight synthetic polymers. It is necessary to degrade or break down the polymer after it has performed its job of reducing the frictional forces encountered when injecting the fracking fluid down into the wellbore and out through perforations in the well casing.

The use of chemical breakers to reduce the viscosity by breaking down the polymeric backbone and linkages of the polymer structure is common. Operators experience difficulty in efficiently and effectively breaking down these polymers at temperatures below 200° F. (93.3° C.). Slickwater fracturing has become more prevalent over the past decade, especially in shale gas and tight sand production reservoirs. Due to low viscosity of the fluid, the pumping flow rate increases to achieve proppant transportation to well fracture. As a result, the energy loss due to the fluid frictional forces inside the downhole tubulars increases. The loss of energy due to this effect requires more hydraulic horsepower in order to overcome this pressure loss. The fluid friction reducers reduce the fluid turbulence, which is a cause of creating back-pressure from within the wellbore, allowing the energy from the surface to be transferred from the surface pumping equipment to the face of the subterranean formation. It is common for the well fracking fluid to be combined with a proppant of different mesh size (typically ranging from 30 mesh to 100 mesh particle size) to "prop" open hydraulically created well fractures once the overburden fluid pressure is relieved. A primary function of the proppant in the fracture fluid is to keep the newly formed fractures open once the pressure is released from the fracture fluid.

Polyacrylamide friction reducers are made of short to long-chain synthetic polymers with ionic functionality, which determines the intended use and specific physical behavior in water. The normal charge density is approximately 30 percent. The charge could be positive (cationic), negative (anionic) or neutral (nonionic). A typical well fracture operation on a single wellbore can use millions of gallons of water and thousands of gallons of polymer in one treatment. The friction reducers work to reduce the turbulent frictional forces between the water and surfaces (wellbore piping, downhole tools, etc.), and between the water and the proppant. The preferred high molecular weight ("HMW") polyacrylamides carry an anionic charge (negative charge) with molecular weights of greater than 1 million, some up to 10 million. The HMW polymers are used in well fracture water in combination with 1 to 5 pounds per gallon of solid proppants (frac sand or ceramic microspheres). The fluid friction reducing polyacrylamides are used in water at concentration from 100 to 500 mg/L active polyacrylamide polymer.

Proppants flow into fractures in the subterranean shale formation. There may be naturally occurring micro/macro fractures in the subterranean formation which also receive proppants. The viscosity of the water, along with a high Reynolds number created by turbulent flow conditions, allows the well fracture water to carry the proppant particles horizontally in wellbore and into the well fractures. The Reynolds number is a dimensionless value that measures the ratio of inertial forces to viscous forces and describes the degree of laminar or turbulent flow. It is accepted that a laminar flow of fluid requires less energy than a turbulent flow. Following the completion of the well fracture operations, it is necessary to break down or degrade the viscosity created by the friction reducing polyacrylamide. The breaking down of the friction reducing polymer greatly reduces the molecular weight and subsequently the viscosity, allowing the fracture water pressured into the formation to flow back out of the shale formation into the wellbore and up to the surface, often called "flowback water." The flowback serves several purposes, including clearing the fracturing fluid to maximize conductivity of the proppant-filled fracture, allowing for improved flow of gas and fluids from within the formation into the wellbore and to the surface.

Oxidizing chemicals are widely used to break down friction reducing polymers to reduce the molecular weight of the polymer, subsequently reducing the viscosity in well fracture fluids. The lower water viscosity allows for more effective flow back of frack water from within the subterranean formation. The oxidizing chemicals are selected to meet the specific physical conditions of each well situation, including polymer concentration and temperature. The oxidizing breaker is added into the well fracture water before the frack water is pumped down into the wellbore. If the oxidizing breaker is too aggressive, it could prematurely reduce the friction reduction ability and reduce the viscosity of the water, and therefore the sand-carrying capacity of the water, causing a settling of the proppants in the wellbore before it enters the subterranean shale formation.

The ability, or the measurement of a formation's ability, to allow fluids to flow is typically measured in darcies or millidarcies. The term or unit of measure was formulated by Henry Darcy, who pioneered methods to describe the fluid flow in porous media. The more permeable a rock formation, the greater the ability of the formation to permit the flow of fluids (e.g., flow of oil, gas and/or water through a porous rock formation). The efficiency of the flowback water to clean the well fracture channels is often reported in laboratory experiments as the "regain permeability." Regain permeability is often discussed in well stimulation procedures as a measurement or gauge of stimulation efficiency. Regain permeability tests are designed to help select the optimum treatment fluid for any given formation with respect to fluid, fluid loss and time to regain eighty percent (80%) to ninety percent (90%) of the initial undamaged permeability of the shale formation. This test can be done in a laboratory using representative core plugs from candidate shale formations. Testing the candidate formation to be fractured by hydraulic fracturing applications can be evaluated using specific test techniques to provide comparison data. The flowback stage is believed to directly represent the fracture cleanup situation and impacts the well's long-term production performance. The more efficient a polymer breaker is at reducing molecular weight and breaking down the polymeric chain, the more improved the regain permeability data obtained in testing. The degradation of friction reducing polyacrylamide polymers can produce small polymer fragments, which have low molecular weights and are not damaging to the reservoirs.

Different types of polymer breakers are used to break down the molecular weight of the friction reducers and retain formation productivity. Typical low temperature (under 200° F. or 93.3° C.) oxidative breaker systems include chemicals such as: ammonium persulfate, sodium persulfate, calcium and magnesium peroxides, and hydrogen peroxide. The breaking of the polymer occurs when the hydroxyl radicals formed by the use of oxidative breakers react with the polymer linkage and work to reduce the molecular weight of the polymer. Other types of polymer breakers are enzymes. Enzymes are large, highly specialized proteins that are produced by living cells to bring about a specific biochemical reaction. They are non-toxic and can be readily broken down, denatured or absorbed back into the environment. Therefore, both hydrogen peroxide and enzyme breakers are considered environmentally friendly. Enzymes are more often used to break guar-based viscosity additives rather than synthetic polymers. Enzymatic breakers are denatured at the higher downhole well temperatures, and they also require specific pH values or they lose their effectiveness. Oxidizing breakers can react too quickly at higher concentrations and higher temperatures, and these breakers will fail to obtain a gradual degradation of polymer (s) contained in well fracture water. Aggressive high breaker concentrations can damage fluid rheology too greatly, thus reducing its effectiveness. The paradox is an oxidizing breaker used at high concentration to improve cleanup will reduce fluid viscosity too quickly for efficient fracture creation and effective proppant placement. The breaking process can be delayed by encapsulating the oxidizing breaker in an impermeable membrane or coating that dissolves and releases the active ingredients slowly.

Another common oxidizing breaker is sodium hypochlorite, (NaClO), which is effective at a concentration of 10% to 12% by weight. It is supplied as an aqueous solution commonly used for temperatures above 210° F. (99° C.).

Aqueous hydrogen peroxide ($H_2O_2$) is an oxidizing polymer-breaking chemical agent which is environmentally friendly. The oxidizing breakers, persulfates and peroxides can undergo thermal decomposition at bottom hole temperatures, thus generating high reactive free radical species (e.g., $\cdot SO_4$ or $\cdot OH$). At a high temperature, the decomposition could be too quick, and the oxidant may be lost before the polymer degradation occurs.

Hydrogen peroxide ($H_2O_2$) is generally known as a bleaching agent and a disinfecting agent. The term hydrogen peroxide hereinafter refers to a dilute aqueous solution of hydrogen peroxide in water. Generally, hydrogen peroxide decomposes or dissociates into oxygen and water. Commercial concentrations of aqueous hydrogen peroxide solutions are typically supplied at thirty-two percent (32%) to thirty-four percent (34%) active and are relatively stable at ambient conditions. Commercial aqueous hydrogen peroxide solutions may contain metal impurities that can be introduced in the dilution water or from handling equipment and storage containers. Among the metals known to decompose hydrogen peroxide are multivalent metals, such as iron, zinc, copper, aluminum, chromium and the like. When the aqueous hydrogen peroxide solution is to be used in an application where metals are present, a stabilizer is necessary to reduce decomposition and preserve the activity of the hydrogen peroxide to perform its intended task over a period of time. The stabilizers, which are generally used in deactivating the decomposing behavior of contaminants, function by forming a complex or through adsorption. The types of stabilizers used in aqueous hydrogen peroxide vary by individual producer and the grade of the product. Common stabilizers include: a) colloidal stannate (tin) and sodium pyrophosphate at 25 to 250 mg/L, b) organophosphonates, c) Nitrate and phosphoric acid, and d) colloidal silicate. U.S. Pat. No. 4,059,678, "Stabilization of Iron-Containing Acidic Hydrogen Peroxide Solutions" published Nov. 22, 1977, discloses chemical additives used to stabilize hydrogen peroxide when metallic contaminants are present, such as amino phosphonic acid iron control chemicals. Technical grade hydrogen peroxide is typically stabilized with low levels of stannate or tin-based compounds and phosphates.

The amount of time to achieve an acceptable polymer break timing is critical to field operations. If the polymer viscosity is broken too quickly, it can cause the proppant in the frack fluid to separate or settle in the downhole piping or fall out of the fluid before reaching a sufficient distance into the produced fracture, resulting in a premature screen-out. Premature breaking can also result in a less efficient fracture width in the created fracture. On the other hand, too much delay in breaking the gel is not desirable either. Delayed breaking can cause significant reduction in the hydrocarbon production. These factors, including breaker reactivity level versus temperature, delay mechanisms, and insufficient breaking or lowering of viscosity of the gel material of the proppant pack, add significantly to the complexity in designing a successful fracture fluid with an effective breaker additive.

U.S. Pat. No. 7,621,335 B2, "Viscosity Breaker for Polyacrylamide Friction Reducers," published on Nov. 24, 2009, teaches breaker agents having a viscosity about that of water, which are selected from the group of hydrogen peroxide, calcium peroxide, magnesium peroxide, and zinc peroxide, without the addition of supplemental stabilizers or enhancers or the addition of supplemental reducing agents. That patent and its references are incorporated herein by reference.

Permeability within the shale formation can be significantly impaired by the resultant polymer residue even though sufficient breaker concentrations have been added to effectively reduce the fluid viscosity. See, for example, the following references, incorporated herein by reference: (1) SPE Technical Paper 20135, "Breaker Concentrations Required To Improve The Permeability Of Proppant Packs Damaged By Concentrated Linear And Borate Crosslinked Fracturing Fluids," H. D. Brannon and R. J. Pulsinelli, Mar. 8-9, 1990; (2) SPE Technical Paper 19402, "Evaluation Of The Breaker Concentrations Required To Improve The Permeability Of Proppant Packs Damaged By Hydraulic Fracturing Fluids," H. D. Brannon and R. J. Pulsinelli, Feb. 22-23, 1990; (3) SPE Technical Paper 19433, "Encapsulated Breaker For Aqueous Polymeric Fluids," J. Gulbis, M. T. King, G. W. Hawkins, and H. D. Brannon, Feb. 22-23, 1990; (4) SPE Technical Paper 21716, "Increased Breaker Concentration In Fracturing Fluids Results In Improved Gas Well Performance," J. Elbel, J. Gulbis, M. T. King, and J. Maniere, Apr. 7-9, 1991.

The proppant pack permeability damage caused by a high concentration of polymers in the pack has been observed to be significantly reduced only by the addition of elevated concentrations of the breaker. Unfortunately, the viscosity reduction of the fracturing fluid is accelerated by increasing breaker concentration and fluid temperature. Breakers can be controlled and/or delayed by coating the breaker. See for example the following U.S. Pat. Nos. 4,202,795; 4,506,734; and 4,741,401.

It is also noted in May 1998 in World Oil Vol. 219 No. 5 the article "Hydrogen peroxide: A new thermal stimulation technique" introduced the concept of injecting fluid with varying percentages of hydrogen peroxide ($H_2O_2$) downhole for the several benefits it offers in its ability to generate in situ heat. There are operational advantages in applications in stimulation, formation damage repair, and reservoir heat flooding and heating for paraffin wax removal from pipelines. See for example in U.S. Pat. No. 2,221,353 the invention pertains to the art of treating oil wells to increase their production and relates more specifically to the removal of clogging deposits of paraffinic, asphaltic, waxy and similar nature by means of an exothermic process.

A need exists for a chemical composition that is usable to more effectively break down low to high molecular weight polyacrylamide friction-reducing polymers and/or viscosity building agents for use in water or water-containing fluids.

A need exists for a hydrogen peroxide-based chemical additive that can break down polymers and can work over a wide range of temperatures, as well as be environmentally safe for use.

Embodiments of the invention, as described herein, meet these needs.

SUMMARY

Embodiments of the present invention include a chemical composition comprising: a) hydrogen peroxide solution, b) an anionic surfactant, c) a metal deactivator, d) a viscosifier, e) a pH buffer and f) an oxidizer stabilizer, usable to more effectively break down low to high molecular weight polyacrylamide friction-reducing polymers and/or viscosity building agents for use in water or water-containing fluids.

In an embodiment, an aqueous hydrogen peroxide solution (concentrated between 7 wt % and 20 wt %) is supplemented with one or more chemicals, including surfactants and stabilizers, which when applied into a water solution containing a low to high molecular weight polyacrylamide, will work to break down polymer. The additive, as described in the present invention, can be used in over a wide range of hydrogen peroxide concentrations.

In an embodiment, the soluble surfactant comprises an alkyl sulfate surfactant (which may include sodium lauryl sulfate or sodium lauryl ethoxy sulfate) at a concentration between 0.1 wt % and 0.8 wt %. In an embodiment, the metal deactivator comprises a chelating agent (which may include diethylenetriaminepentaacetate, n-(hydroxyethyl)-ethylenediaminetriacetic acid, ethylenediaminetetracetic acid, iminodissuccinic acid, itaconic acid, iminodisuccinic acid, iminodiacetic acid, glutamic acid n,n-diacetic acid, polyaspartic acid, nitrilotriacetic acid, citric acid, erythorbic acid, or ascorbic acid) at a concentration between 0.1 wt % and 0.5 wt %. In an embodiment, the pH buffer comprises an acid (which may include acetic acid, oxalic acid, sulfonic acid, sulfamic acid, toluene sulfonic acid, 2-ethyl hexanoic acid, methane sulfonic acid, tartaric acid, lactic acid, or propionic acid) at a concentration between 0.1 wt % and 0.8 wt %. In an embodiment, the oxidizer stabilizer comprises a zinc compound (which may include zinc sulfate, zinc acetate, zinc oxide, zinc chloride, or zinc gluconate) at a concentration between 0.05 wt % and 0.5 wt %. In an embodiment, the viscosifier may comprise a polyethylene oxide having a molecular weight between one and eight million, at a concentration between 0.05 wt % to 0.1 wt %.

The hydrogen peroxide-based chemical additive, used as a way of breaking down polymer, has the advantage of working over a range of temperatures, from 90° F. to 180° F. (32° C. to 82° C.). The chemical additives used in this invention are safe for the environment.

When added to well fracture fluids containing polyacrylamide polymers, the additive of this invention reduces polymer viscosity to acceptable levels at low application treating volumes.

BRIEF DESCRIPTION OF THE DRAWINGS

FIG. 1 depicts the results of viscosity measurements of a control blend and a blend including two embodiments of the present invention.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The present invention includes embodiments of a composition and method of using an aqueous surfactant-stabilized hydrogen peroxide-based polymer breaker for breaking down and removing polymer. The hydrogen peroxide is the active ingredient and, in a solution, is stabilized against decomposition of the hydrogen peroxide, which delays or retards the polymer-breaking action.

Embodiments of the present invention comprise chemical compositions that can comprise: a) hydrogen peroxide, b) a surfactant, c) metal deactivator, d) viscosifier, e) pH buffer and f) oxidizer stabilizer, which are usable to more effectively break down low to high molecular weight polyacrylamide friction-reducing polymers and/or viscosity building agents for use in water or water-containing fluids.

In an embodiment, an aqueous hydrogen peroxide solution is supplemented with one or more chemicals, including surfactants and stabilizers, which when applied into a water solution containing a low to high molecular weight polyacrylamide polymer, will work to break down the polymer. The additive, as described in the present invention, can be used in over a wide range of hydrogen peroxide concentrations e.g., seven percent (7%) to twenty percent (20%), and a wide range of temperatures, including downhole temperatures e.g., from about 90° F. to at least 180° F. (32° C. to 82° C.). At these temperatures, the chemical composition can be effectively advantageous downhole in degrading the molecular weight of the polyacrylamide to greatly improve the polymer removal during flowback and to increase regain permeability of a shale formation.

The hydrogen peroxide solution contains a number of ingredients, which can include: (a) hydrogen peroxide ($H_2O_2$) solution in a concentration between 7% and 20%; (b) an anionic surfactant selected from a group consisting of sodium lauryl sulfate (SLS), sodium lauryl ethoxy sulfate (SLES) with 1 to 4 moles of ethylene oxide per mole of alkyl sulfate at 0.1% to 0.8% concentration. The preferred alkyl sulfate is sodium lauryl ethoxy sulfate with 3 moles of ethylene oxide. Additionally, a hydrophobic anionic surfactant can be used in combination with the above, selected from a group of linear 6-carbon to 16-carbon hydrophobe at 0.1% to 0.8% concentration. Surfactant hydrophobes used in the invention can include disodium decyl(sulfophenoxy) benzenesulfonate; disodium oxybis(decylbenezenesulfonate); sodium alkyl diphenyl oxide disulfonate (ADPODS); sodium C10 (linear) diphenyl oxide disulfonate; sodium decyl diphenyl oxide disulfonate; sodium hexadecyldiphenyloxide disulfonate; sodium C16 (linear) diphenyl oxide disulfonate; disodium dihexyldiphenyloxide disulfonate. The preferred linear hydrophobe surfactant is a 16-carbon linear hydrophobe, commercially known as Dowfax 3B2 or Dowfax 8390. In an embodiment, an organic acid can be used at a quantity sufficient to lower the hydrogen peroxide solution to a pH of between 4.5 and 5.5; (c) a metal chelating agent, including one or more of the following: diethylenetriaminepentaacetate (DTPA), N-(hydroxyethyl)-ethylenediaminetriacetic acid (HEEDTA), ethylenediaminetetracetic acid (EDTA), iminodissuccinic acid, itaconic acid, iminodisuccinic acid (IDS), iminodiacetic acid (IDA), glutamic acid N,N-diacetic acid, (GLDA), polyaspartic acid (PA), nitrilotriacetic acid (NTA), citric acid, erythorbic acid, ascorbic acid, or their sodium or potassium salts, in a concentration from 0.1% to 0.5%, the preferred metal chelating agent is DTPA; (d) A high molecular weight polyethylene oxide (PEO) to improve the stability of the hydrogen peroxide. Polyethylene oxides are water-soluble polymers. The PEO provides binding, thickening, water retention and film formation. It is preferred to use a PEO with a molecular weight between 1 million and 8 million, and more specifically, a PEO molecular weight between 2 million and 5 million. The PEO has the ability to reduce friction due to its high molecular weight and polymeric form; however, the inventors have found that the viscosifying effect of the PEO is primarily indirect when initially applied, via the PEO acting as a stabilizer to reduce the degradation of the hydrogen peroxide, with the direct viscosifying or friction reduction properties dominating as the time advances. The PEO additive may be present in a concentration of about 0.005 to 0.1 wt %. (e) a pH buffer intended to lower the pH of the peroxide solution to less than pH 5.0. Buffers used in the invention can include: acetic acid; oxalic acid; sulfonic acid; sulfamic acid; toluene sulfonic acid; 2-ethyl hexanoic acid; methane sulfonic acid; tartaric acid; lactic acid; and propionic acid. The preferred buffer to lower the pH is methane sulfonic acid and toluene sulfonic acid. The pH buffer may be present in a concentration of about 0.1% to 0.8%. (f) a soluble compound containing zinc ions such as zinc sulfate, zinc acetate, zinc citrate, zinc oxide, zinc chloride, or zinc gluconate in a concentration of about 0.05% to 0.5%. The preferred zinc compound is zinc sulfate heptahydrate ($ZnSO_4 \cdot 7H_2O$);

A composition containing the above-mentioned ingredients provides excellent polymer breaking of polyacrylamide polymer friction reducers in water. The composition can be used at downhole temperatures from 90° F. to 180° F. (32° C. to 82° C.). At these temperatures and treatment concentrations of 0.5 to 1.5 gallons per thousand gallons (500 ppm to 1,500 ppm), the composition is effective at degrading the molecular weight of the polyacrylamide to greatly improve polymer removal during flowback and to increase regain permeability of the shale formation.

The composition can comprise six components in an aqueous solution: a) hydrogen peroxide solution, b) a surfactant, c) a metal deactivator, d) a viscosifier, e) a pH buffer and f) an oxidizer stabilizer. Additional chemical additives can be added to buffer the pH of the hydrogen peroxide solution to aid in reducing the loss of activity over time.

It is preferred that all of the components of the composition be free or have low concentrations of materials that can contribute to the decomposition of hydrogen peroxide, such as organic matter, transition metals, and other material.

The hydrogen peroxide concentration can be at any level for which an effective breakdown of the viscosity is achieved. The preferred hydrogen peroxide concentration of the invention is in a range from 7% to 20% hydrogen peroxide concentration. The most preferred hydrogen peroxide concentration depends upon the individual well conditions and activity of friction reducer polymer in the water.

In general, the treatment activity for hydrogen peroxide required for effective polymer degradation and/or for viscosity reduction are 0.2 gallons per thousand gallons (GPT) up to 3.0 GPT of a 7% up to 20% by weight hydrogen peroxide activity. These rates of addition are sufficient for the majority of slickwater applications, without being corrosive or difficult to transport and store. Higher hydrogen peroxide activity in the treatment chemical may be too aggressive in breaking polymer, and require additional handling precautions in the field.

Turning now to FIG. 1, a graph (100) of viscosity in cP (102) over time in minutes (104) is shown comparing four samples 1 gpt of friction reducing polymer polyacrylamide and/or hydrolyzed polyacrylamide. Samples 1-3 (106, 108, 110) comprise additives, the components of which are listed below as Table 1:

TABLE 1

| Sample 1 (106) | 1 gpt 18% H₂O₂ |
|---|---|
| Sample 2 (108) | 1 gpt 18% H₂O₂ |
| | 0.1-0.3% DTPA |
| | 0.2-0.5% SLES |
| | 0.1-0.2% methane sulfonic acid |
| | 0.1-0.4% ADPODS |
| | 0.1-0.2% Zn salt |
| Sample 3 (110) | Sample 2, plus |
| | 0.01-0.05% PEO |
| Sample 4 (112) | control (no additives) |

As FIG. 1 shows, the additives considerably improve the characteristics of the hydrogen peroxide. The Sample 4 (112) control polymer shows no decline in viscosity, while the viscosity of the additive-less hydrogen peroxide blend (Sample 1) reduces too fast; this can adversely affect the initial viscosity of the polymer and cause the proppant to settle or fall out of the flowing water entirely, which is not desired. Samples 2 (108) and 3 (110) show considerably increased utility as the hydrogen peroxide stays present long enough to provide a controlled decrease of polymer viscosity return the proppant back through the formation; the PEO additive allows Sample 3 (110) to retain the same basic curve as the blend in Sample 2 (108), but with a considerably slower decline in viscosity. With Sample 3 (110) as an additive, the selectivity and degradation rate of polymer are high, the use of hydrogen peroxide is improved, and the fluid flowback is easily recovered.

While the invention is susceptible to various modifications and alternative forms, specific embodiments thereof have been described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The invention claimed is:

1. An aqueous polymer breaking fluid comprising a solution of:
hydrogen peroxide, in a concentration between 7 wt % and 20 wt %;
a soluble zinc compound, in a concentration between 0.05 wt % and 0.5 wt %;
a metal chelating agent;
an acidic pH buffer; and
an alkyl sulfate surfactant,
wherein the solution is diluted in the aqueous polymer breaking fluid at a level of 0.2 to 3.0 gallons of solution per thousand gallons of the aqueous polymer breaking fluid.

2. The fluid of claim 1, wherein the soluble zinc compound is selected from the group consisting of: zinc sulfate, zinc acetate, zinc citrate, zinc oxide, zinc chloride, of and zinc gluconate.

3. The fluid of claim 1, wherein the metal chelating agent is present in the solution at a concentration between 0.1 wt % and 0.5 wt %.

4. The fluid of claim 1, wherein the metal chelating agent is selected from the group consisting of: diethylenetriaminepentaacetate, n-(hydroxyethyl)-ethylenediaminetriacetic acid, ethylenediaminetetracetic acid, iminodissuccinic acid, itaconic acid, iminodiacetic acid, glutamic acid n,n-diacetic acid, polyaspartic acid, nitrilotriacetic acid, citric acid, erythorbic acid, ascorbic acid, and any sodium or potassium salts thereof.

5. The fluid of claim 1, wherein the alkyl sulfate surfactant is present in the solution at a concentration between 0.1 wt % to 0.8 wt %.

6. The fluid of claim 1, wherein the alkyl sulfate surfactant is selected from the group consisting of: sodium lauryl sulfate er and sodium lauryl ethoxy sulfate.

7. The fluid of claim 1, wherein the pH buffer is present in the solution at a concentration between 0.1 wt % to 0.8 wt %.

8. The fluid of claim 1, wherein the pH buffer is selected from the group consisting of: acetic acid, oxalic acid, sulfonic acid, sulfamic acid, toluene sulfonic acid, 2-ethyl hexanoic acid, methane sulfonic acid, tartaric acid, lactic acid, and propionic acid.

9. The fluid of claim 1, wherein the solution further comprises a linear hydrophobe surfactant.

10. The fluid of claim 9, wherein the linear hydrophobe surfactant is present in the solution at a concentration between 0.1 wt % to 0.8 wt %.

11. The fluid of claim 9, wherein the linear hydrophobe surfactant is selected from the group consisting of: disodium decyl(sulfophenoxy)benzenesulfonate, disodium oxybis (decylbenezenesulfonate), sodium alkyl diphenyl oxide disulfonate, sodium C10 (linear) diphenyl oxide disulfonate, sodium decyl diphenyl oxide disulfonate, sodium hexadecyldiphenyloxide disulfonate, sodium C16 (linear) diphenyl oxide disulfonate, and disodium dihexyldiphenyloxide disulfonate.

12. The fluid of claim 1, wherein the solution further comprises polyethylene oxide.

13. The fluid of claim 12, wherein the polyethylene oxide is present in a concentration between 0.005 wt % to 0.1 wt %.

14. The solution of claim 12, wherein the polyethylene oxide has a molecular weight between one million and eight million.

* * * * *